United States Patent [19]

Fujiwara

[11] Patent Number: 4,827,314
[45] Date of Patent: May 2, 1989

[54] OPTICAL ILLUMINATION DEVICE FOR USE IN A COPYING APPARATUS

[75] Inventor: Takao Fujiwara, Osaka, Japan

[73] Assignee: Minolta Camera Kabushiki Kaisha, Osaka, Japan

[21] Appl. No.: 160,636

[22] Filed: Feb. 26, 1988

[30] Foreign Application Priority Data

Mar. 3, 1987 [JP] Japan ............................ 62-30703[U]

[51] Int. Cl.$^4$ ...................... G03B 27/74; G03B 27/80
[52] U.S. Cl. .................................... 355/68; 355/14 E; 355/69
[58] Field of Search ...................... 355/8, 14 E, 68, 69, 355/1

[56] References Cited

U.S. PATENT DOCUMENTS

| | | | |
|---|---|---|---|
| 4,084,898 | 4/1978 | Kurita | 355/8 |
| 4,124,294 | 11/1978 | Nakamura | 355/68 |
| 4,413,903 | 11/1983 | Corona et al. | 355/68 |
| 4,518,249 | 3/1985 | Murata et al. | 355/67 |
| 4,540,279 | 9/1985 | Irie et al. | 355/69 |
| 4,636,063 | 1/1987 | Takai et al. | 355/68 |
| 4,653,904 | 3/1987 | Imamura | 355/68 |

*Primary Examiner*—Fred L. Braun
*Attorney, Agent, or Firm*—Price, Gess & Ubell

[57] ABSTRACT

An optical illumination device for a copying apparatus which includes a light source, a series of reflectors, and a light detecting member for detecting the amount of light reflected off of the original document to control the intensity of the light source. The series of reflectors includes two reflectors on the opposite side of the optical path from the light source which are integrally formed to provide an L-shape configuration in cross section. One of the integrally formed reflectors reflects the light from the document onto the light detecting member.

6 Claims, 4 Drawing Sheets

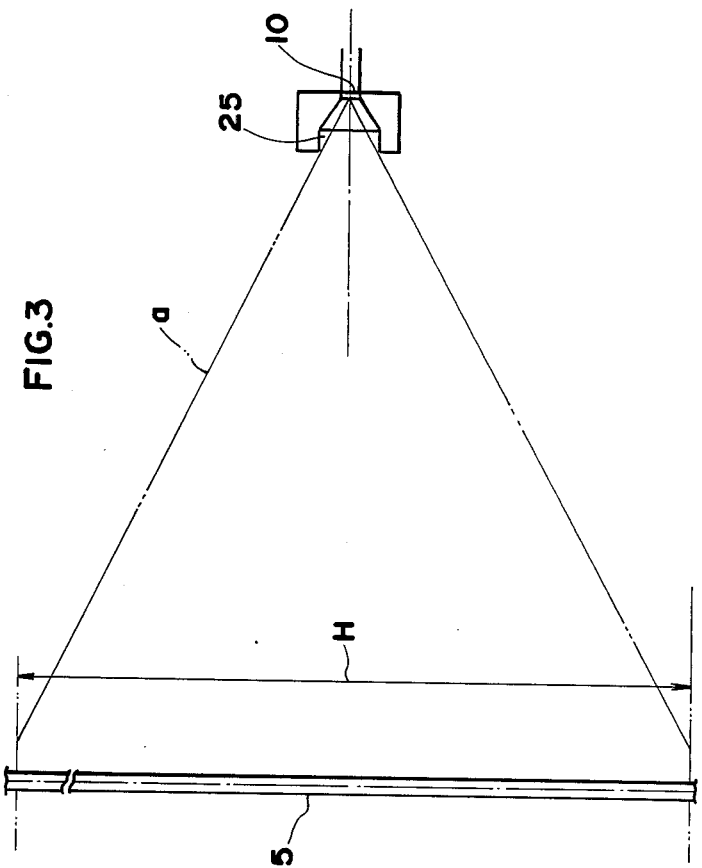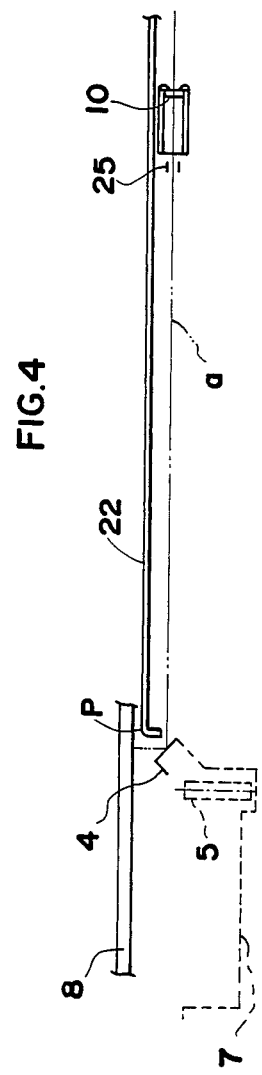

OPTICAL ILLUMINATION DEVICE FOR USE IN A COPYING APPARATUS

BACKGROUND OF THE INVENTION

The present invention relates to an optical illumination device for an electrophotographic copying apparatus and more specifically relates to an optical illumination device having an exposure regulating means.

Automatic illumination devices for electrophotographic copying machines wherein light is projected from a lamp onto an original document, the amount of light reflected from said document is detected, and the amount of light exposure to the photosensitive member is automatically controlled in correspondence with the detection signal volume are well known.

Japanese laid-open utility mode Patents Sho 60-76254 and Sho 61-6837, for example, disclose illumination devices which expose the photosensitive member to the light emitting from an illumination source which is reflected from an original document via a condensing/light-transmitting array, and wherein the reflected light from the original document disposed immediately above said array is condensed by lenses so as to provide incident rays to the photoreceptor disposed outside the optical path toward the photosensitive member.

However, these illumination devices have a disadvantage in that the response of the illumination controls is poor because a portion of the light reflected to the photosensitive member is also provided to the photoreceptor.

Japanese laid-open Patent Sho 56-110961 attempts to resolve this disadvantage. The illumination device disclosed in this has an elliptical reflecting mirror which directs the light from the light source to the original document, said reflecting mirror also being provided with an aperture in one portion. The reflecting mirror condenses the light projected to the document to be scanned, and the aperture of said reflecting mirror projects light to the document portion directly preceding the scan. This illumination device transmits reflected light from the document portion immediately preceding the scan via an optical fiber, detects the amount of reflected light by light receiving elements, and adjusts the exposure by comparing the detection signal volume with a predetermined reference value.

Thus, the illumination control response delay can be prevented because this illumination device adjusts the light source by detecting light reflected from one portion of the original document immediately prior to the scan and then adjusts the light source accordingly. However, illumination is unwarrantedly more than required because of the aperture formed on a portion of the elliptical reflecting mirror, and the device itself is made more costly still by the use of optical fiber as the light transmission means. A further disadvantage lies in the complexity of the structure from the light source to the photoreceptor.

SUMMARY OF THE INVENTION

A main object of the present invention is to provide an illumination device which can automatically control the amount of illumination and has a generally simpler and more economical construction.

Another object of the present invention is to provide an illumination device having integrated components which allows easy, quick assembly, replacements, and adjustment of components.

A further object of the present invention is to provide an illumination device which can adjust illumination of the original document image to the photosensitive member via feedback so as to prevent a response delay.

A still further object of the present invention is to provide an illumination device which can illuminate the photosensitive member by making efficient use of the light from the light source.

The objects are accomplished by the illumination device of the present invention for electrophotographic copying machines which comprises a light source, a first reflecting mirror which conducts light from said light source to the surface of the original document, a second reflecting mirror which conducts a portion of the light reflected by said first reflecting mirror to the surface of the original document, a condensing light-transmitting array which condenses light reflected from the surface of the original document and transmits same to the photosensitive member, a third reflecting mirror which conducts a portion of the aforementioned light reflected from the original document to a photoreceptor provided opposite the light source through the aforementioned condensing/light-transmitting array, and a support member which supports as an integrated unit said light source, said first reflecting mirror, said second reflecting mirror, said condensing/light-transmitting array, and said third reflecting mirror, and wherein said second and third reflecting mirrors form a cross section angular shape with said second reflecting mirror comprising one inclined plane and said third reflecting mirror comprising the other inclined plane, and wherein the original document is scanned by changing the positional relationship of said support member and said original document, and wherein said third reflecting mirror reflects light from the portion of the document to be scanned immediately prior to scanning with said light being condensed by the aforementioned array, and wherein the light source illumination is controlled in accordance with the amount of light received by the aforementioned photoreceptor.

BRIEF DESCRIPTION OF THE DRAWINGS

These and other objects and features of the present invention will become apparent from the following description taken in conjunction with the preferred embodiment thereof with reference to the accompanying drawings, in which:

FIG. 3 is a plan view showing the positional relationships of the photoreceptor and the illumination device in the present embodiment.

FIG. 4 is a side view of the elements of FIG. 3.

DESCRIPTION OF THE PREFERRED EMBODIMENT

The preferred embodiment of the illumination device of the present invention for use in electrophotographic copying machines is hereinafter described with reference to the drawings.

Figure 1:
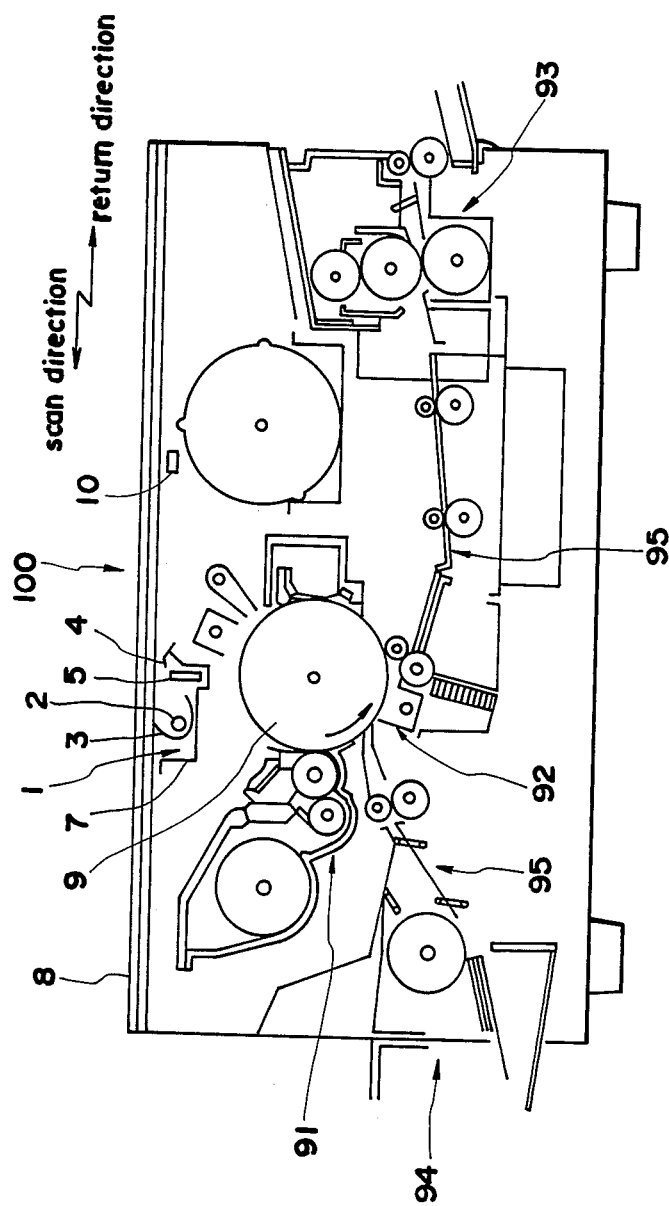
FIG. 1 is a longitudinal section view of an electrophotographic copying machine with an embodiment of the illumination device of the present invention installed therein.

Referring to FIG. 1, a brief longitudinal section view of the structure of the entire copying machine 100 with the installed illumination device 1 of the present invention is shown. The electrophotographic copying machine 100 has a moveable-type document platen 8, and the illumination device 1 is fixedly mounted within the machine housing. The structure of said copying machine 100 is only briefly described since it comprises, with the exception of the illumination device 1, conventional components well known to those skilled in the art, e.g., a latent image forming device with a photosensitive member 9 at its center, a developing device 91, a transfer device 92, a fixing device 93, a copy paper supply device 94, a copy paper transport device 95 and the like.

Figure 2:
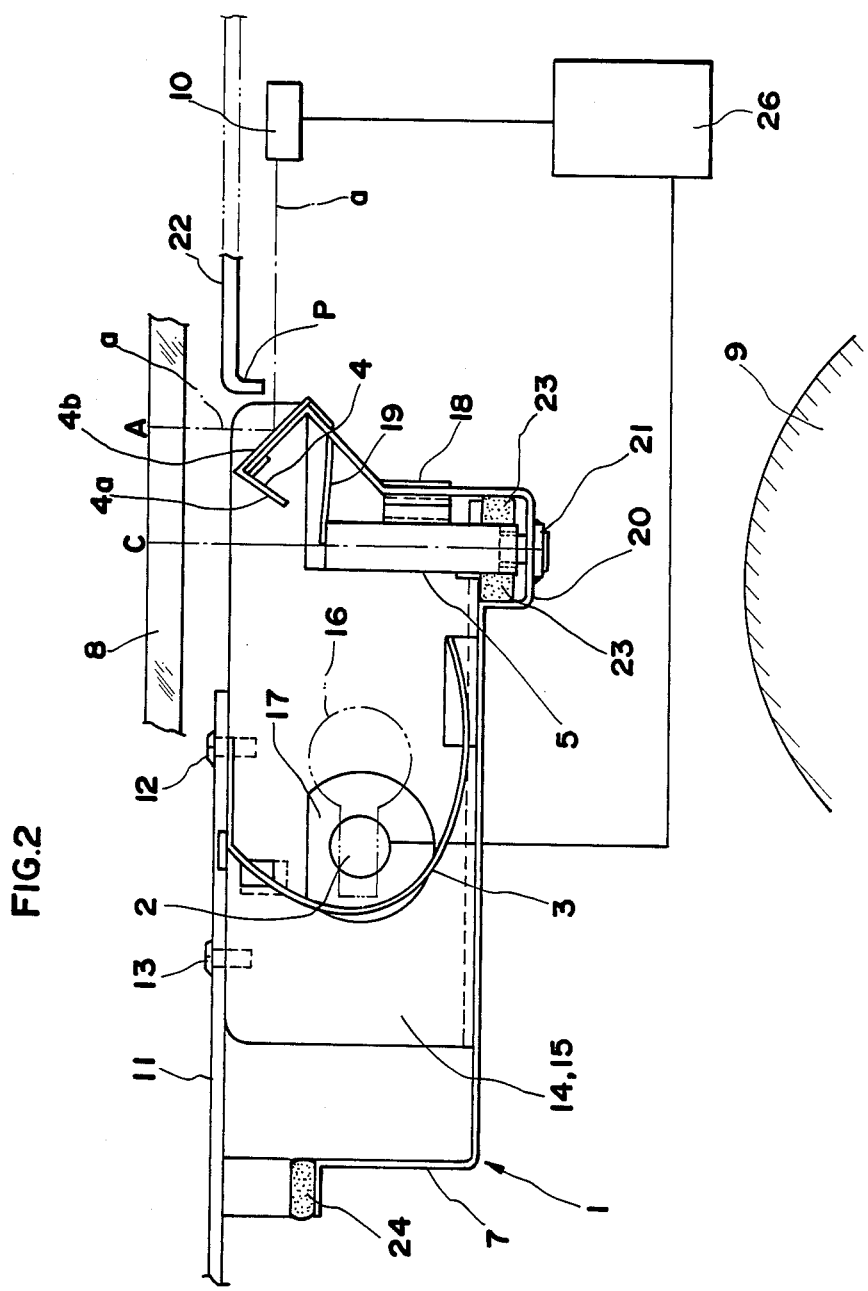
FIG. 2 is a brief section view showing details of an embodiment of the illumination device of the present invention.

Referring to FIG. 2, the illumination device 1 of the present invention comprises a light source 2, a first reflecting mirror 3, a second reflecting mirror 4a, a condensing/light-transmitting array as a projection lens 5, e.g. a SELFOC lens (Nippon Sheet Glass Co., Ltd.) a third reflecting mirror 4b, and a support member 7 which integrates these structural elements into a single unit. Although a halogen lamp is used as light source 2 in the present embodiment, another type of lamp with similar characteristics may also be used. The first reflecting mirror 3 conducts light emitted by light source 2 to the surface of the original document through document platen 8, and possesses a configuration (nearly elliptical in the present embodiment) such that the light emitted from light source 2 is efficiently reflected. The second reflecting mirror 4a forms one inclined plane of the cross section angular member 4. The second reflecting mirror 4a reflects a portion of the light reflected by the aforesaid first reflecting mirror 3 to the surface of the original document from a different angle. Further, the function of said second reflecting mirror 4a is to prevent the appearance of document shadowing.

Lens 5 condenses light reflected by the document image and transmits it to photosensitive member 9. The third reflecting mirror 4b is provided to conduct a portion of the light reflected from the document surface to the photoreceptor 10 disposed opposite the light source 2 through lens 5. The aforesaid third reflecting mirror 4b forms the other inclined plane of the previously mentioned angular member 4.

In FIG. 2, at the top right side the support member 7 has the angular member 4 mounted thereto, and is fixedly mounted in the housing as a structural component of the illumination device 1. Both sides of support member 7 have side panels 14 and 15 attached thereto shown in the interior foreground and background of the drawing, said side panels having caulking for first reflecting mirror 3 interposed therebetween. Further, the outer sides of side panels 14 and 15 hold lamp terminals to hold the lamp not shown in the drawing. The rectangular portion of the key hole-shaped orifice 16 on side panel 14 is used to stop lamp rotation and prevent positional deviation of said lamp with regards to the perpendicular direction of the document width. Also, the components holding the lamp terminals not shown in the drawing have internal threads and are fixedly attached to the upper left of a frame 11 via screws 12 and 13. The right side of support member 7 has attached thereto a pressure bar spring 18 to restrain the end of lens 5. Focal adjustments between the document platen 8 and the photosensitive member 9 are accomplished by adjusting the plate spring 19 above lens 5 and the machine screw (hollow set machine screw) 21 mounted to the bottom portion 20 of support member 7. The aforesaid plate spring 19 and machine screw 21 are provided, of course, outside the optical path of light emanating from light source 2.

The second reflecting mirror 4a is attached to the support member 7 as a single unit structure with the third reflecting mirror 4b. Reflected light "a" reflected by the first reflecting mirror 3 to the document pre-scanning position "A" is reflected therefrom via third reflecting mirror 4b to the photoreceptor 10. Frame 22 is provided above the light receiving elements 10. Frame 22 has a curved portion "P" at its front end. The edge of the curved portion P prevents the appearance of deleterious reflection-induced light, thereby effectively increasing the strength of illumination. The curved portion P is desirable from the standpoint of eliminating deleterious light insofar as it can be lengthened to approach the third reflecting mirror 4b without encroaching on the optical path to the photoreceptor 10. The aforesaid photoreceptor 10 converts the input light to an electrical signal and transmit said signal to the control portion 26. Thereupon, the control portion 26 gives feedback to the light source 2 and adjusts the illumination emanating therefrom. Light source 2 is removeably maintained by the lamp terminals, not shown in the drawing, on the outside of side panels 14 and 15. Item "C" in the drawing is the document scanning position immediately above lens 5.

In addition to the aforesaid components, the illumination device 1 has provided thereto a light shield 23 to shield light around lens 5, and light shield 24 to prevent light from light source 2 from leaking into the copying machine 100.

As described above, the various structural elements of the present embodiment of the illumination device 1 are supported as an integrated unit by support member 7, said illumination device 1 being easily assembled and adjusted while removed from the copying machine, and also being readily replaced during service due to said features.

The positional relationships of the photoreceptor 10 and the illumination device 1 attached to the housing of the copying machine 100 (see FIG. 1) are shown in plan view in FIG. 3 and side view in FIG. 4, respectively.

Referring to FIGS. 3 and 4, the photoreceptor 10 receives reflected light "a" from the third reflecting mirror 4b through slit 25 provided anteriorly to said photoreceptor. In the illumination device of the present embodiment, automatic illumination is conducted by photometry based on an A4 size paper width (210 mm).

Since a wide region of illumination, labeled "H" in FIG. 3, is obtained in the present illumination device 1, the region which is photometrically measurable by photoreceptor 10 is broad, thereby increasing the photometric precision.

Figure 5:
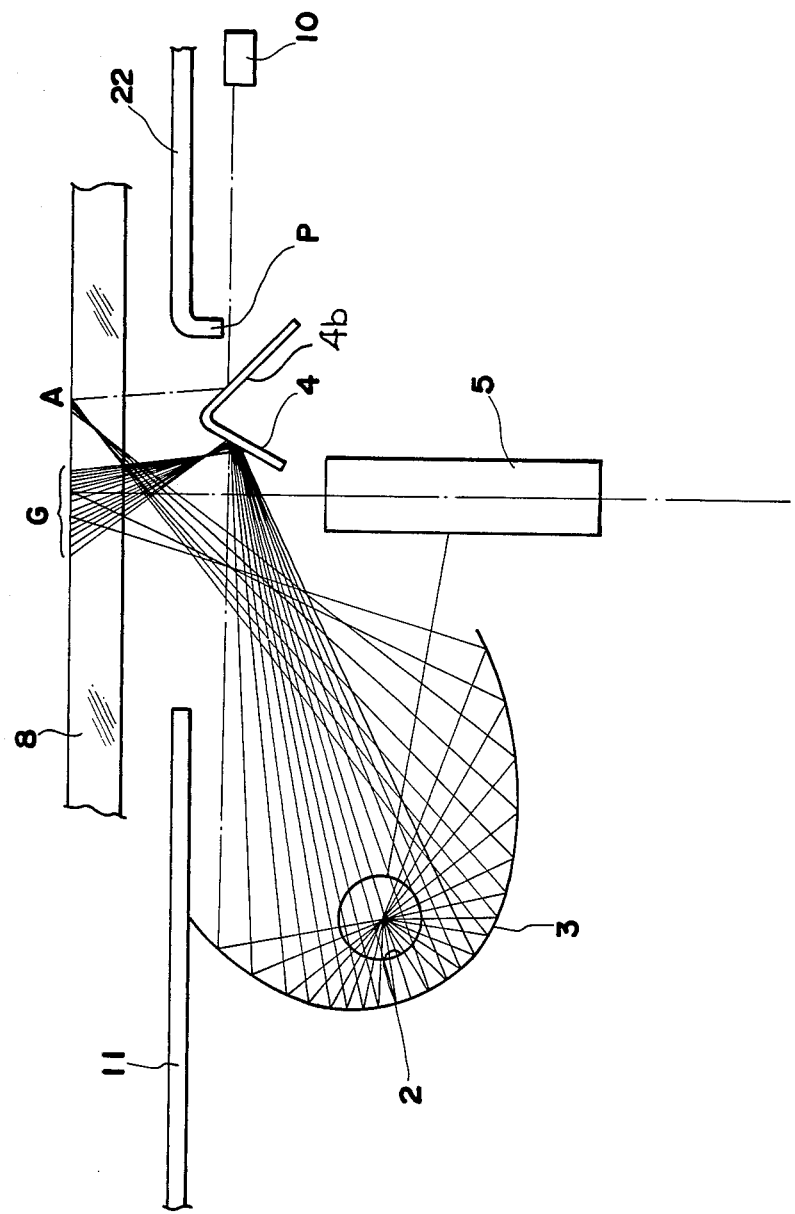
FIG. 5 is an optical path diagram showing the illumination device of the invention in its present embodiment.

A major characteristic of the present embodiment of the illumination device 1 of the invention is the provision of the angular member 4 of which one inclined plane is formed by the second reflecting mirror 4a and the other inclined plane is formed by the third reflecting mirror 4b, as shown in FIG. 5. Referring to FIG. 5, light from light source 2 is reflected by the first reflecting mirror 3 and is conducted not only to the document image region "G" immediately above lens 5, but also to pre-scanning position "A". The light reflected at position "A" is introduced to third reflecting mirror 4b so as to widen the span of condensed light. In the aforesaid construction, the document is scanned by the document platen 8 moving from the pre-scanning position "A" to scanning position "C" (right to left in the drawing), whereby the photosensitive member 9 (see FIG. 2) is exposed.

Subsequently, light discharged from the advanced portion of scanning position "C" (right side in drawing), that is, pre-scanning position "A" is reflected by the third reflecting mirror 4b and conducted to photoreceptor 10 provided opposite the light source 2 through lens 5. In other words, the illumination adjustment feedback can be achieved without a response delay because the illumination device 1 formerly measures the amount of light reflected from a portion of the original document to be scanned immediately thereafter.

The illumination device of the present invention for use in electrophotographic copying machines comprises a light source, first reflecting mirror, condensing/light transmitting array, second reflecting mirror, and a third reflecting mirror integrated into a single unit by a support member, thereby allowing the illumination device to be removeable as a unit, thus easily assembled and replaced. Furthermore, the illumination device produces no unevenness of illumination when installed in the copying machine because positional adjustments of the various structural components can be made when said device is removed from the copying machine as a unit. Accordingly, dispersion is reduced due to the increased precision possible among the various structural components, making elimination of uneven illumination unnecessary.

The illumination device 1 of the present invention provides a simple and economic configuration because reflected light "a" which is reflected from the pre-scanning position "A" is reflected to photoreceptor 10 via the second and third reflecting mirrors 4a and 4b which form a unit.

Further, the illumination device 1 of the present invention has superior responsiveness, and illumination is controllable because light reflected from the document immediately preceding the portion projected to the photosensitive member is conducted to the photoreceptor.

Although the present invention has been fully described by way of example with reference to the accompanying drawings, it is to be noted that various changes and modifications are apparent to those skilled in the art. Therefore, unless such changes and modifications otherwise depart from the scope of the present invention, they should be construed as included therein.

What is claimed is:

1. An optical illumination device for use in a copying apparatus of the type wherein an object is illuminated and projected onto a photoconductive member by changing a relative position of said object and said photoconductive member, said device comprising:
   a light source;
   a first reflector conducting light from said light source to said object;
   a second reflector positioned opposite said light source for conducting light from said light source to said object such that the illumination of said object passes through an optical path from said object to said photoconductive member;
   a light detection element provided opposite said light source with respect to said path;
   a third reflector conducting light reflected from said object to said light detection element;
   illumination control means for controlling illumination of said light source in accordance with the amount of light received by said light detection element,
   wherein said third reflector reflects light from the next portion of said object to be projected immediately thereafter,
   and said second and third reflectors formed integrally to provide substantially an L-shape in its cross section.

2. The optical illumination device as claimed in claim 1, further comprising a support member supporting as an integrated unit said light source, said first reflector, said second reflector and said third reflector.

3. The optical illumination device for use in a copying apparatus of the type wherein an original document is illuminated and an image thereof is projected to a photoconductive member, said device comprising:
   a light source;
   a first reflector conducting light from said light source to said document;
   a second reflector conducting light to said document and positioned opposite said light source with respect to an optical path from said document to said photoconductive member;
   a light detection element provided opposite said light source with respect to said path;
   a third reflector conducting light reflected from said document to said light detection element;
   illumination control means for controlling illumination of said light source in accordance with the amount of light received by said light detection element;
   a document platen for mounting said original document, said platen movable over said light source,
   wherein said third reflector reflects light from the forward portion of said document relative to said path in a direction of movement of said document platen,
   and said second and third reflectors formed integrally to provide substantially an L-shape in its cross section.

4. The optical illumination device as claimed in claim 3, further comprising a support member supporting as an integrated unit said light source, said first reflector, said second reflector and said third reflector.

5. An optical illumination device for use in a copying apparatus of the type wherein an object is illuminated and projected onto a photoconductive member by changing a relative position of said object and said photoconductive member, said device comprising:
   a light source;
   a first reflector conducting light from said light source to said object;
   a second reflector conducting light to said object and positioned opposite said light source through an optical path from said object to said photoconductive member;
   a light detection element provided opposite said light source through said path;
   a third reflector conducting light reflected from said object to said light detection element;
   illumination control means for controlling illumination of said light source in accordance with the amount of light received by said light detection element;

an object platen for mounting said object, said platen movable over said light source, wherein said third reflector reflects light from the forward portion of said object relative to said device in a direction of movement of said object platen, and said second and third reflectors are formed integrally to provide substantially an L-shape in its cross section.

6. The optical illumination device as claimed in claim 5, further comprising a support member supporting as an integrated unit said light source, said first reflector, said second reflector and said third reflector.

* * * * *